Jan. 2, 1968     O. KUTAL     3,361,255
METHOD OF AND DEVICE FOR ELECTRONIC MEASUREMENT
AND CLASSIFICATION OF OBJECTS
Filed Oct. 21, 1965     3 Sheets-Sheet 1

INVENTOR.
Oldrich Kutal
BY Michael S. Striker
Attorney

United States Patent Office 3,361,255
Patented Jan. 2, 1968

3,361,255
METHOD OF AND DEVICE FOR ELECTRONIC MEASUREMENT AND CLASSIFICATION OF OBJECTS
Oldřich Kutal, Chrudim, Czechoslovakia, assignor to Elite, narodni podnik, Varnsdorf, Czechoslovakia
Filed Oct. 21, 1965, Ser. No. 499,253
7 Claims. (Cl. 209—74)

ABSTRACT OF THE DISCLOSURE

An arrangement for sorting objects on the basis of their dimensional characteristics. A plurality of the characteristic dimension of the objects or items are detected by photo-sensitive devices located within the region of the objects to be sorted. Through pulse circuits operating in conjunction with the photo-sensitive devices, the characteristic dimensions are converted to pulse trains which, in turn, are registered in counters. The pulses are in the form of code numbers representing the desired dimension against which the items are to be sorted. The code number is maintained in storage, in the registers or counters, until another object or item arrives with the same dimensional characteristics. At that point a coincident signal is generated for actuating mechanism by which the items of like characteristics are sorted together by being physically moved into the same chute or compartment. The arrangement includes provision for resetting the code numbers stored in the counters as desired.

---

The invention relates to a method of automatic electronic measurement and classification of objects, more particularly of flat objects which are either completely opaque, or have a varying light transparency over their surface, the measurement and classification being accomplished in accordance with at least two geometrical parameters of the objects read by means of a system of photoelectric sensing units issuing electric pulses in dependence on the optical nature of the respective places of the surface of the objects.

Measurement with a view towards classification into pairs of higher groups, for example groups of 3, 4 etc. is used in the textile industry, for example in hosiery production, for supplying pairs of socks or ladies' stockings with substantially equal units. Such units must have a substantially equal overall length, height of the top and shaded length, length of the heel splice, commonly called the cuban, and the toe, within predetermined production tolerances. Pairing has hitherto been accomplished either manually or semiautomatically.

If manual pairing is used, the individual units of the measured and classified products have to be checked visually and sorted out from a large amount of products. It is obvious that this method can only check a limited number of decisive and important parameters, and that the accuracy of the checking depends on the individual qualities and senses of the checker. The checker decides by his eye whether the controlled parameters agree in the two units of a pair, and his decision is therefore strongly subjective. This method is therefore not very accurate; moreover it is lengthly, tedious and little efficient.

A device for this type of measurement and classification has already been proposed using a measuring desk which is provided with push buttons arranged one after the other into line segments or curves in accordance with the tested parameters of the checked object. Around the table are arranged sorting out or receiving supports with arms for stockings of different lengths within tolerances occurring in the production. Each of the sorting out arms is arranged in the current circuit of two push buttons providing a light signalization indicating the respective sorting out arm. The checked stocking is stretched out on the measuring desk between the push buttons to find which extreme push button from the beginning of the test position agrees with the checked parameter of the stocking. The push button is depressed and the respective light signalization indicates the sorting out arm to which the tested stocking belongs with regard to the one tested parameter, for example the length. The accuracy of this method depends on the skill of the checker, his reactions, and the checking speed is limited. Also this method is not satisfactory for production testing.

A device has also been proposed which measures the length of a stocking by means of sensing units provided by photoelectric elements arranged on the measuring desk. This device is more efficient than the device using push buttons, but it is not adapted for checking several parameters when pairing stockings not only with respect to their length but also with respect to their heel splice, or also their toe. Additional manual measurement is still required in such cases.

Another device has been proposed for measuring larger parameters or large dimensions of textile areal configurations, such as stockings and socks, by photoelectric means. The parameters of the tested objects are read by photoelectric sensing units in the form of electric pulses which are further processed in logic circuits. The resulting combination of all checked parameters is here defined by a single output pulse which controls the actuating mechanism of the sorting out device. This measurement is attended with the disadvantage that each combination of parameters requires its own independent signalization circuit or sorting out place. This imposes a considerable reduction of the classifying capacity of the device allowing only about 30 to 50 combinations of parameters to be treated by the device. But under usual production conditions the differences occurring in the parameters of the produced stocking lead to a much greater variety of likely combinations of parameters which increases with the increased requirements on accuracy of the measurement of the tested parameters. It has been found that the number of likely different combinations lies in the order of 100,000. This device allows therefore only classification of a certain part of all produced stocking. The remainder has to be tested again and again until all products have been sorted out. The efficiency of this device is therefore also limited.

The general object of the invention is therefore elimination of the drawbacks of the known state of art.

Another general object of the invention is the improvement of known devices for measuring and sorting out products of the mentioned type to allow quick and reliable sorting out of all products.

A special object of the invention is to allow automatic measurement and classification of textile products, such as socks and ladies' stockings, for sorting them out into pairs, or sorting out other products into higher groups, for example groups of 2, 3, 4, etc.

Another object of the invention is to allow automatic measurement and classification of flat textile products in accordance with several checked parameters, for example the length, height of the top, shaded length and other parameters of ladies' stockings, within certain tolerances predetermined for classification by the device.

Still another object of the invention is to allow the above measurement and classification with a limited number of sorting out places which is considerably lower than the number of combinations of various parameters likely to occur for example in the production of ladies' stockings.

To achieve the above and other objects, the invention employes electronic means to control the classification steps, and sorting out of the controlled objects is accomplished with respect to at least two geometrical parameters of these objects which are indicated by pulses from photoelectric sensing units. In accordance with the method of this invention, pulse trains, the pulse number of which depends on the scanned parameter and are transformed in coding circuits of a counter system into a code number representing this parameter. The code numbers of all controlled parameters of the checked object are combined in a main register into a main code number, and the object giving this main code number is transported into a sorting out location to await there its pair or higher group unit. The main code number of the first object of the pair or higher group is also stored in an auxiliary register to serve as coincidence or reference main code number for the other unit or units of the pair. This other unit or units is found by checking other similar objects until an object is found which gives the same main code number (respecting of course certain predetermined tolerances). The code number of the first tested object of the group, that is the reference code number stored in the auxiliary register is compared in a coincidence or reference circuit against the main code number obtained from following objects until the two main code numbers, that is the reference main code number and the main code number of another tested object coincide. In this case the coincidence circuit issues an order to transport the pair unit into the same sorting out location as already occupied by the first unit with the corresponding parameters located in this location. If no corresponding reference code number has been found, the tested object is directed into an empty sorting out location. Actuating members may be used to direct the tested object into the respective sorting out location by pneumatic means.

If all sorting out locations are already occupied and a newly tested object gives a main code number which does not correspond to any code number of the already located objects, this object is directed into a collecting location for objects which in such a case cannot find their group units. After some time, such objects are withdrawn from this collecting location and again tested. No auxiliary register of course is required for this collecting location because they have been temporarily placed outside the pairing process.

To carry out the method in accordance with the invention, a pulse generator acting as clock unit is connected through a ring counter and a gating circuit with the output of the respective photoelectric sensing units which are connected with the input circuits of coding circuits of a counter. These coding circuits are connected by means of gating circuits with a main register which is connected on the one hand with auxiliary register cooperating with respective sorting out location, and on the other hand with coincidence circuits controlling actuating members, the gating circuits being controlled by a program unit.

A collecting mouth or other similar device is used to feed the tested objects through tubes into the respective sorting out locations. The latter are connected with suction tubes opening into a distribution tube which is connected with a ventilator. In the space of the sorting out location the tubes cooperating with the collecting mouth are provided with a discharge member which opens by means of two tipping members actuated for example by means of a microswitch through a pull rod to discharge the tested object into the respective sorting out location.

An advantage of the invention resides in the fact that it allows to match into pairs or higher groups a great number of combinations of parameters, for example of ladies' stocking because each sorting out location is ready to receive another combination of parameters after one combination has been sorted out by finding the group member or members. The number of combinations which can be sorted out by means of the device according to the invention with a limited number of sorting out locations is therefore several thousand times higher than with hitherto known pairing or grouping methods and devices.

Any sorting out location can be freed receiving objects with a new main code number by cancelling the reference code number stored in the respective auxiliary register either after the first or any higher complementary unit received in this sorting out location.

Another advantage of the invention resides in the fact that the human factor can be completely eliminated from the selecting and matching process. The operation carried out in the finishing department can be mechanized because the selecting process and the sorting out steps are automatic.

A further advantage of the invention is very high accuracy of the measuring process.

The above and other objects, advantages and features of the invention will be best understood from the following specification to be read in conjunction with the accompanying drawings illustrating a preferred example of embodiment. In the drawings.

Figure 1:
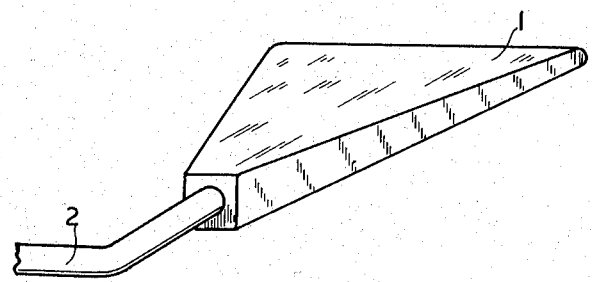
FIG. 1 illustrates a collecting mouth used in the device according to the invention for collecting the tested object.

Referring now more particularly to the figures, 1 in FIG. 1 denotes a collecting mouth whose function will be explained in more detail below. This mouth rests on a non-illustrated work desk of the sorting out device in accordance with the invention, for matching for example ladies' stockings into pairs. This mouth opens into a variety of collecting pipes $2a \ldots 2n$ also shown in FIG. 2. The number of these tubes is the same as the number of the collecting or sorting out locations in the device, for example 45.

Figure 2:
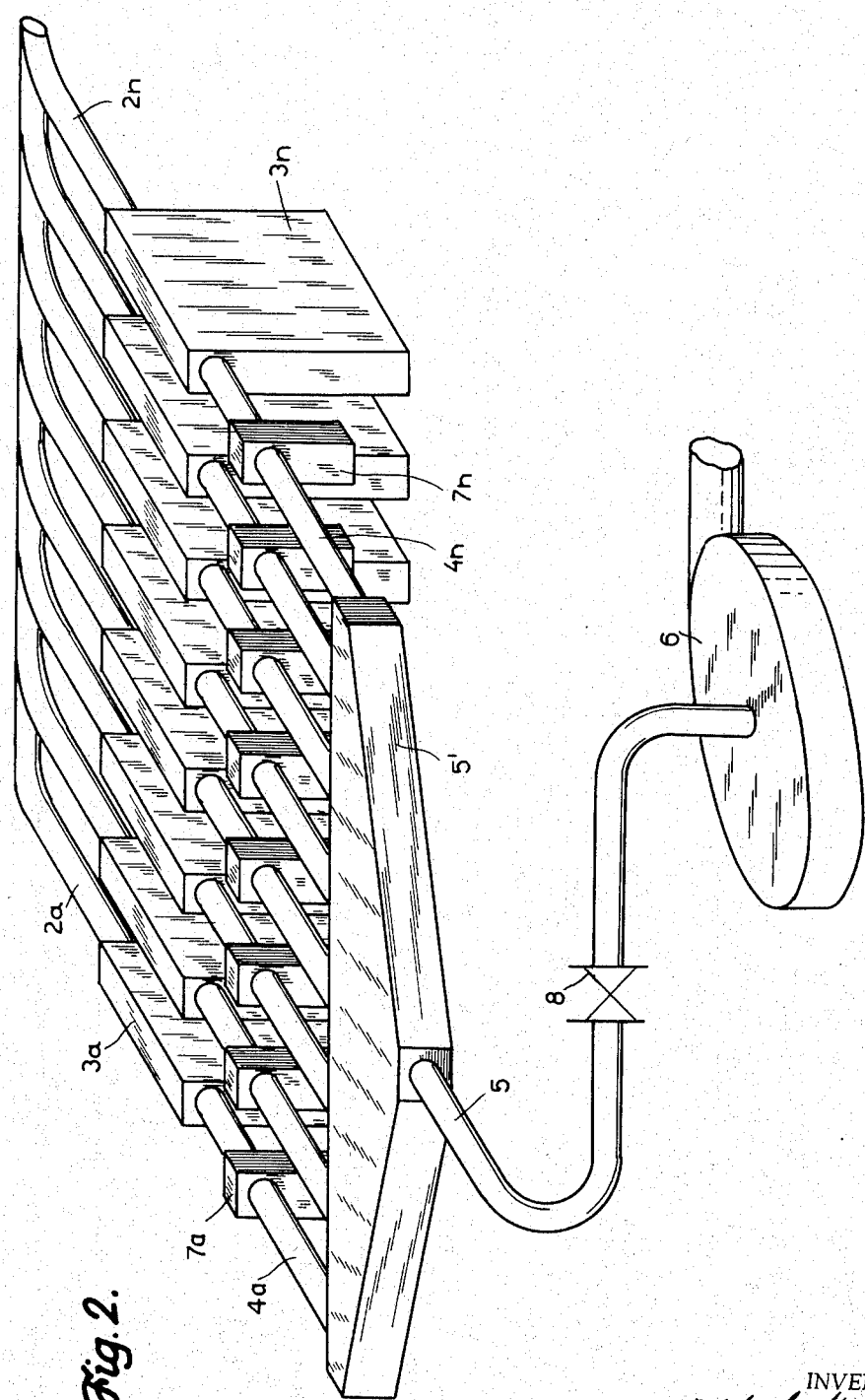
FIG. 2 shows diagrammatically the mechanical part of the device in accordance with the invention.

As shown in more detail in FIG. 2, these tubes $2a \ldots 2n$ open into sorting out locations $3a \ldots 3n$, for example collecting boxes or sorting out arms, and the like. Into each sorting out location $3a \ldots 3n$ opens a suction pipe $4a \ldots 4n$ lying between the sorting out location and a distribution pipe 5 opening into a ventilator 6. Each suction pipe $4a \ldots 4n$ is provided with an actuating member $7a \ldots 7n$ which may be for example an electromagnetic valve. The distribution pipe 5 is widened at one end into a throat 5' to receive all suction pipes $4a \ldots 4n$ and, between this throat 5' and the ventilator 6, it is provided with a main closing valve 8.

Figure 3:
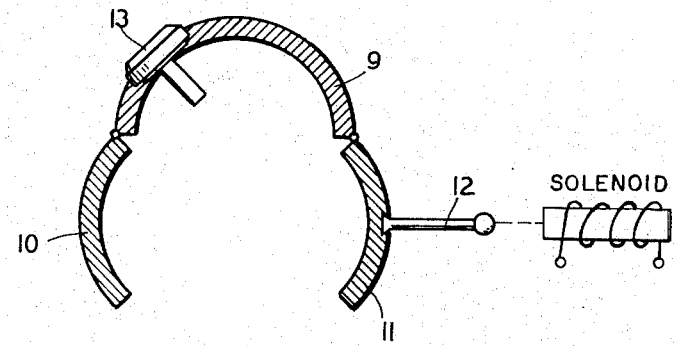
FIG. 3 illustrates an outlet tube member through which the sorted out object is let out into its sorting out place.

Each collecting pipe $2a \ldots 2n$ which passes through the sorting out space $3a \ldots 3n$ and joins the suction pipe $4a \ldots 4n$ is provided in the space of the sorting out location $3a \ldots 3n$ with an outlet or discharge member 9 illustrated in more detail in FIG. 3.

The lower half of this discharge member 9 is formed by two tipping members 10, 11 having the shape of ring sectors which are mechanically controlled by the pull rod 12. This pull rod is controlled by a non-illustrated electromagnetic system through the microswitch 13.

Figure 4:
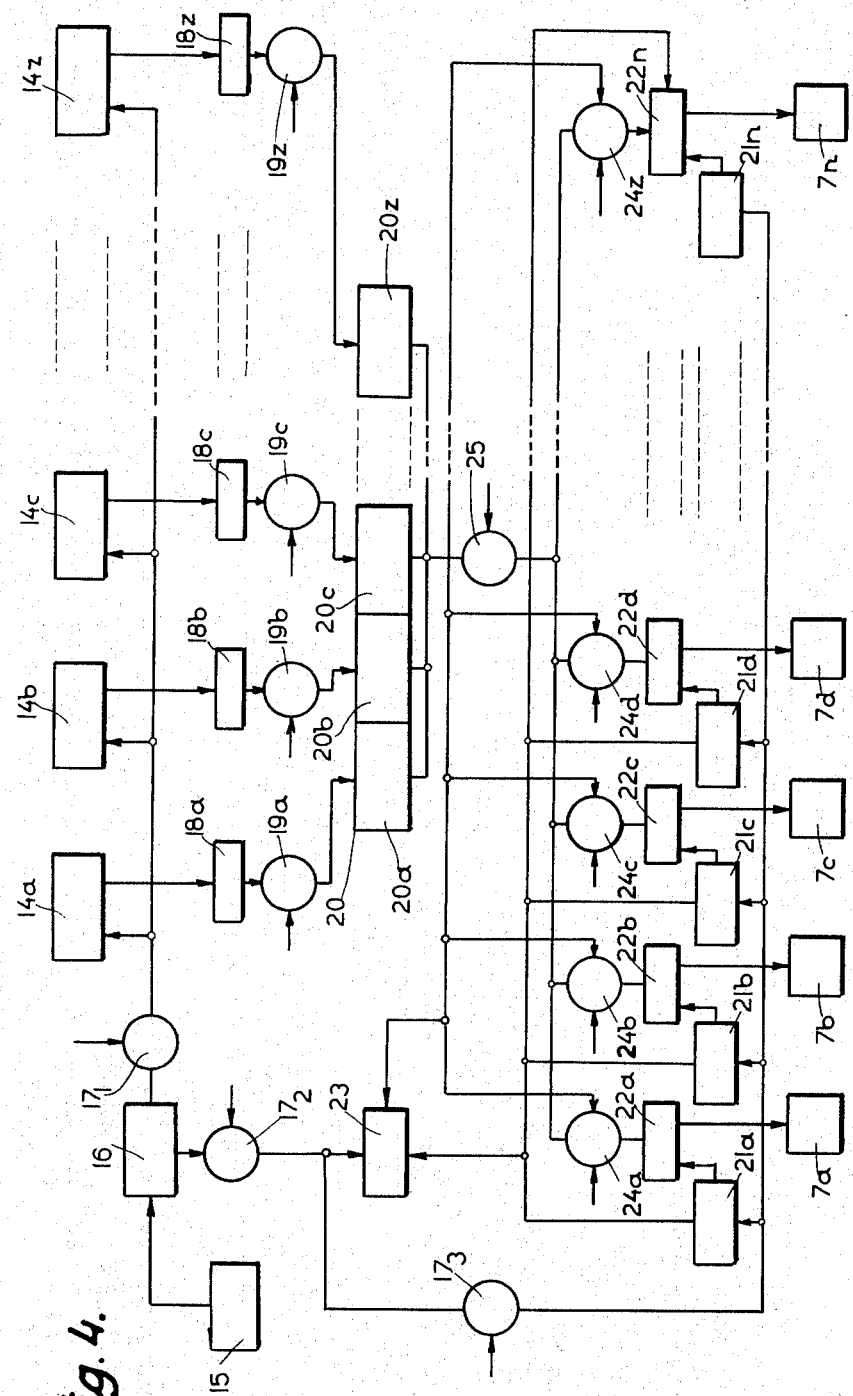
FIG. 4 illustrates the principal units of the electronic circuit diagram used in the device according to the invention.

On the non-illustrated work desk on which the stockings are placed to be measured and sorted out in accordance with their main parameters, there are provided sensing units $14a \ldots 14z$, see FIG. 4, of the photoelectric type, such as for example photodiodes and phototransistors. These sensing units form a system divided into line segments and curves covering the shape of the main parameters of the tested products to be checked. The number $z$ of the sensing elements and the system into which they are arranged is so selected that they cover completely all sizes and types of products likely to occur.

FIG. 4 illustrates the main units of the electronic circuit arrangement used in the invention. In this figure like parts occurring also in FIG. 3 have been marked with like numbers and symbols. The notation of the other references in FIG. 4 is as follows:

15 is a pulse generator of the clock unit or digital clock type which produces electric pulses at regular time intervals for synchronising the operation of the entire device; 16 is a ring counter, but any suitable type of commutator or sequencing unit may also be used; the operation of this unit will be explained below and it should be understood that this unit can be replaced by other arrangement achieving the same purpose; $17_1$, $17_2$, and $17_3$ are gating circuits which are controlled either manually (for example for starting operation) or from a program unit; $18a \ldots 18z$ are coders; $19a \ldots 19z$ are other gating circuits; 20 is the main memory or main register; $21a \ldots 21n$ are auxiliary memories or auxiliary registers; $22a \ldots 22n$ are coincidence circuits or comparators; 23 is the central program unit containing the whole program of the operation of the device; this central program unit is constructed like the program unit of a computer and it determines the sequence of the various steps of the device, their duration and the end of each operation; $24a \ldots 24n$ are other gating circuits for controlling the comparators; and 25 is a gating circuit controlled from the program unit; it passes the whole main code number from the main register.

The operation of the measuring and sorting out device in accordance with the invention will now be explained in more detail.

A non-illustrated light source illuminates the work table with the system of the photoelectric sensing units $14a \ldots 14z$ which form the input sensing units providing electric pulses for controlling the various units of the device. It should be obvious that the photoelectric sensing units can read only those parameters which cause a certain number of the sensing units to be covered against the light from the illumination source of the work desk, while other units remain uncovered and exposed to the light. Due to this fact, the device can test either completely opaque objects, the reading pulses being supplied by the sensing units which remain uncovered by the contours of the object, or partly opaque and partly transparent objects with a different degree of transparency in which case the level of the light of the illumination source is adjusted to such a value that it penetrates only through certain parts of the objects in dependence on their degree of transparency.

The same evaluation device can be used for both types of tested objects.

The tested stocking or another tested object is spread out on the work desk and some of the photoelectric units which are not covered against the light of the switched on illumination source produce an electric pulse. The total of the electric pulses produced in all uncovered and therefore lit sensing units is characteristic of the tested parameters. The pulse generator 15 which operates as a digital clock produces at regular time intervals clock pulses which synchronise the operation of the device. The clock pulses are processed in the ring counter 16, or in another device capable of performing an operation to the same effect. The object of the ring counter 16 in the circuit arrangement is to switch in, one after the other, the signals of the various photoelectric sensing units at a certain time interval which is produced due to the fact that after a certain number of pulses of short duration from the digital clock 15, the ring counter 16 issues a trigger pulse which controls the respective pulses from the lit photoelectric sensing units $14a \ldots 14z$. Thus the state of the sensing units is read one after the other. Suppose, for example, that three parameters of the stocking are to be checked, namely the length, the position of the heel splice, and the top of the stocking. All these parameters are read simultaneously, that is the various photoelectric sensing units for one parameter are read or scanned one after the other, but for all three parameters simultaneously. Another sequence may of course also be selected. The pulses from the various lit sensing units $14a \ldots 14z$ are read in cooperation with the gating circuits $17_1$, $17_2$, $17_3$, controlled manually for the start. These gating units transmit the command issued by the program unit 23 to the various sensing units and thus control the beginning and the end of the operation of each unit. The device for reading the state of the photoelectric sensing units which is informative of the checked parameters comprises therefore the clock unit 15, the ring counter 16 and the gating circuits $17_1$, $17_2$, $17_3$. The pulses from the sensing units are then fed into the coders $18a \ldots 18z$ which transform them into a code number for each of the checked parameters, that is into three code numbers in the case considered. Through the gating circuits $19a \ldots 19z$ these code numbers are then fed by order from the program unit 23 into the main register 20 comprising number section $20a \ldots 20z$ which determine the order or sequence or the various numbers of the complete main code combining the three individual codes or the three checked parameters into a single main code number. The main code register comprises so many sections that it can cover even the highest number of places of the resulting main code number. For simplicity's sake the number of the sections of the main register has been marked in the drawing as $z$. The code remains registered in the main register until completion of the selection checking.

By further order from the program unit 23 accomplished through the gating circuit 25, the main code number is now transmitted through the gating circuits $24a \ldots 24z$ into the coincidence circuits or comparators $22a \ldots 22n$, $n$ being the number of the available sorting out locations.

The main code numbers of stockings already occupying the sorting out locations $3a \ldots 3n$ which were stored in the auxiliary registers $21a \ldots 21n$ are also fed by order from the program unit 23 into the comparators $22a \ldots 22n$.

The comparison step is carried out even in the case when no objects have yet been placed into the empty sorting out locations. The command for registration in the first available free auxiliary register is given by successive connection with the various registers.

If all sorting out locations are occupied but no coincidence with a main code number from the auxiliary registers can be established in the comparators, a case of overfilling occurs. A red light may, for example, be lit in such a case on a single collecting location receiving all objects which cannot be temporarily located because of overfilling of the sorting out locations. After a certain time, these unsorted stockings or other objects are returned into the sorting out cycle.

The comparators $22a \ldots 22n$ compare the main code number of the just measured stocking against the main code numbers of the stockings already registered in the auxiliary registers $21a \ldots 21n$. In case of coincidence between the main code number of the measured stocking with one of the main code numbers of the already located stockings registered by the auxiliary registers $21a \ldots 21n$, the respective comparator $22a \ldots 22n$ transmits a pulse to the respective actuating member $7a \ldots 7n$ which opens the respective suction tube $4a \ldots 4n$ and the created air current draws in the tested stocking into the collecting mouth 1, and hence further into the respective discharge member 9 of the respective sorting out location $3a \ldots 3n$. The impact of the stocking on the microswitch 13 closes the same and a non-illustrated electromagnet controlling the pull rod 12 is operated opening the two tipping parts 10, 11 through which the stocking is discharged into the sorting out location containing already a stocking with the main code number. At the same time order may be given for deleting the preceding record in the respective auxiliary register $21a \ldots 21n$.

Deletion of the previous recording in the auxiliary register may be accomplished after the second, third, fourth or any higher group member directed into the respective sorting out location. This deletion order may be derived, for example, from the microswitch, or from a timing circuit of the program unit, and the like.

If the main code number from the main register 20 does not coincide with any main code number from the auxiliary registers 21a . . . 21n because all sorting out locations are empty, the program unit issues an order to the actuating member 7a . . . 7n of an unoccupied sorting out location to open the respective suction tube 4a . . . 4n. The tested stocking is drawn in and discharged into the respective unoccupied sorting out location through the respective discharge member 9a . . . 9n as the first unit of the new group to be formed in this sorting out location.

After collection of a desired number of complete groups in the various sorting out locations, the groups are withdrawn therefrom and passed on for further handling.

What we claim is:

1. Method of measuring and classifying objects, more particularly flat objects which are either completely opaque, or have a varying light transparency over their surface, the measurement and classification being accomplished in accordance with at least two geometrical parameters of the object read by means of a system of photoelectric sensing units issuing electric pulses in dependence on the optical nature of the respective places of the surface of the objects, comprising the following steps:

illuminating the system of photoelectric sensing units;
   placing the tested object against the said system of photoelectric sensing units;
   transforming the produced groups of pulses for each tested parameter into a code number;
   combining all produced code numbers into a single main code number in a main register;
   comparing the said main code number against main code numbers corresponding to already tested and located objects, previously registered in auxiliary registers and including the case of no previous record;
   directing the tested object into a sorting out location in accordance with the result of the comparison; and
   deleting the main code number in the main register.

2. Method as claimed in claim 1, including the step of deleting the main code number recorded in an auxiliary register after a predetermined number of tested objects have been located in the corresponding sorting out location.

3. A device for measuring and classifying objects comprising:

a system of photoelectric sensing units generating pulses adapted to the parameter to be checked;
   an illumination source affecting the said system of photoelectric sensing units;
   a device for reading the state of the photoelectric sensing units;
   coders for transforming the pulses from the photoelectric sensing units into code numbers for each checked parameter;
   a main register in which all code numbers are combined into a single main code number;
   auxiliary registers;
   means for connecting the said main register with the said auxiliary registers in which the main code numbers are stored at their first occurrence;
   means for connecting the said main register and auxiliary registers with coincidence circuits for comparing the main code number from the main register against the main code numbers stored in the auxiliary registers;
   sorting out locations for receiving the tested objects;
   actuating members controlled by the coincidence circuits for directing the tested object into the respective sorting out location; and
   a program unit for controlling the sequence of the operations or all units of the device.

4. The device as defined in claim 3, wherein:

the said device for reading the state of the photoelectric sensing units comprises a pulse generator, for example a digital clock, a cyclic pulse switch, for example a ring counter, and a gating circuit in series relationship with the pulse outputs of the said system of photoelectric sensing units; and
   the said means for connecting the said main register with the said auxiliary registers and both types of the registers with the coincidence circuits comprises gating circuits.

5. The device as defined in claim 3, including:

a collecting mouth;
   collecting pipes joined with the said collecting mouth and opening into the said sorting out locations;
   suction pipes following after the said sorting out locations;
   a distribution pipe into which extend all said suction pipes; and
   a ventilator connected with the said distribution pipe.

6. The device as defined in claim 5, including:

a discharge member in the sorting out location between each collecting pipe and the corresponding suction pipe.

7. The device as defined in claim 6, wherein the said discharge member comprises:

tipping members for opening the discharge members;
   a pull rod controlling the said tipping members;
   and means for controlling the said pull rod in accordance with the result of the comparison in the said coincidence circuits.

References Cited

UNITED STATES PATENTS

| | | | |
|---|---|---|---|
| 2,630,043 | 3/1953 | Kolisch | 209—82 X |
| 2,853,188 | 9/1958 | Milliken. | |
| 3,173,015 | 3/1965 | Monneypenny et al. | 88—14 |
| 3,206,023 | 9/1965 | Kronsbein. | |
| 3,224,322 | 12/1965 | Westbrook. | |

ALLEN N. KNOWLES, *Primary Examiner.*

M. HENSON WOOD, JR., *Examiner.*